United States Patent [19]
Schröck et al.

[11] Patent Number: 5,969,077
[45] Date of Patent: Oct. 19, 1999

[54] POLYSILOXANES CONTAINING HETEROCYCLIC FUNCTIONS, THEIR PREPARATION AND USE

[75] Inventors: Robert Schröck, Altötting; Jochen Dauth; Bernward Deubzer, both of Burghausen, all of Germany

[73] Assignee: Wacker-Chemie GmbH, Munich, Germany

[21] Appl. No.: 09/163,526

[22] Filed: Sep. 30, 1998

[30] Foreign Application Priority Data

Oct. 2, 1997 [DE] Germany ............... 197 43 722

[51] Int. Cl.[6] ........................................... C08G 77/12
[52] U.S. Cl. ........................... 528/31; 427/387; 524/188; 528/27; 528/38; 528/40; 528/41
[58] Field of Search ................. 528/27, 31, 38, 528/40, 41; 524/188; 427/387

[56] References Cited

U.S. PATENT DOCUMENTS

| | | |
|---|---|---|
| 5,540,952 | 7/1996 | Canivenic et al. ............ 427/387 |
| 5,770,299 | 6/1998 | Dannenhauer et . |

FOREIGN PATENT DOCUMENTS

| | | |
|---|---|---|
| 39 42 663 | 6/1991 | Germany . |
| 195 41 028 | 5/1997 | Germany . |
| 195 44 130 | 5/1997 | Germany . |
| 2 268 906 | 1/1994 | United Kingdom . |
| 2 282 145 | 3/1995 | United Kingdom . |

OTHER PUBLICATIONS

Derwent Abstract #91–231516 [323] corresponding to DE 39 42 663 A1.
Derwent Abstract # 97–290514 {27} corresponding to DE 195 44 130 A1.

Primary Examiner—Morton Foelak
Attorney, Agent, or Firm—Brooks & Kushman P.C.

[57] ABSTRACT

Organosiloxane compounds bearing nitrogen-containing heterocycles, in which the heterocycles are bonded to a silicon atom via divalent radicals containing a unit of the general formula (I)

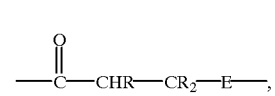

in which

E is one of the radicals —O—, —S—, —NR$^1$— or —N=, where R and R$^1$ are each a C$_1$- to C$_{20}$-hydrocarbon radical which is optionally substituted by halogen, amine, ammonium or mercapto groups and may optionally be interrupted by groups chosen from —C(O)—, —C(O)—O—, —C(O)—NR$^3$—, —NR$^3$—, —O—, —S—, and —N= is a constituent of a heterocycle, can be used for the treatment of textile fibers, textile sheet materials and leather and as stabilizers in synthetic polymers.

20 Claims, No Drawings

POLYSILOXANES CONTAINING HETEROCYCLIC FUNCTIONS, THEIR PREPARATION AND USE

TECHNOLOGICAL FIELD

The invention relates to organosiloxane compounds bearing nitrogen-containing heterocycles, and their preparation and use for the treatment of textile fibers, textile sheet materials and leather, and as stabilizers in synthetic polymers.

DESCRIPTION OF THE RELATED ART

U.S. Pat. No. 5,540,952 describes the use of polyorganosiloxanes bearing nitrogen-containing heterocycles for the low-yellowing finishing of textiles. The polyorganosiloxanes bearing heterocycles are in this reference prepared from polyorganosiloxanes containing glycidyl groups and aminofunctional heterocycles by heating over a long period to at least 120° C., or by means of hydrosilylation of a heterocycle having alkenyl groups with SiH-containing polysiloxanes in the presence of a platinum catalyst. Heating readily leads to discoloration of the products; reactive groups, such as, for example, acrylates are not thermostable. The platinum catalyst must be removed, at high expense, since platinum can lead to sensitization upon skin contact when the textile is used.

SUMMARY OF THE INVENTION

The present invention provides, in a simple manner, organopolysiloxanes which bear nitrogen-containing heterocycles.

DETAILED DESCRIPTION OF THE PREFERRED EMBODIMENT

The invention provides organosiloxane compounds bearing nitrogen-containing heterocycles, in which the heterocycles are bonded to a silicon atom via di- or polyvalent radicals which contain a unit of the general formula (I)

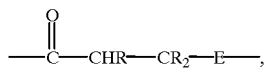
(I)

in which

E is selected from the radicals —O—, —S—, —NR$^1$— or —N=, where

R and R$^1$ are each a hydrogen atom or a $C_1$- to $C_{20}$-hydrocarbon radical, which is optionally substituted by halogen, amine, ammonium or mercapto groups and may optionally be interrupted by groups selected from —C(O)—, —C(O)—O—, —C(O)—NR$^3$—, —NR$^3$—, —O—, —S—, and —N= is a constituent of a heterocycle.

The organosiloxane compounds bearing nitrogen-containing heterocycles permit the block-like incorporation of heterocycles into a siloxane chain as well as pendant and terminal functionalization.

The organosiloxane compounds preferably contain moieties selected from units of the general formulae (II), (III) and (IV)

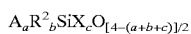
(II),

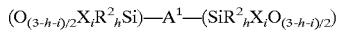
(III),

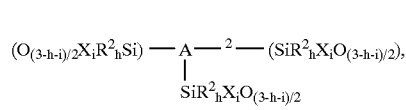
(IV)

where

R$^2$ is a monovalent, divalent or trivalent hydrocarbon radical having from 1 to 50 carbon atoms per radical, which is optionally substituted by halogen, amine, ammonium, mercapto, acrylate or maleinimide groups, X is a chlorine atom or a radical of the formula —OR$^4$, where R$^4$ is a hydrogen atom or an alkyl radical having from 1 to 8 carbon atoms per radical, which may be substituted by an ether oxygen atom, or is a radical of the general formula (V)

(V)

where

R$^5$ is a divalent hydrocarbon radical having from 2 to 30 carbon atoms per radical, which may be interrupted by one or more groups selected from groups of the general formulae (VI) and (VII)

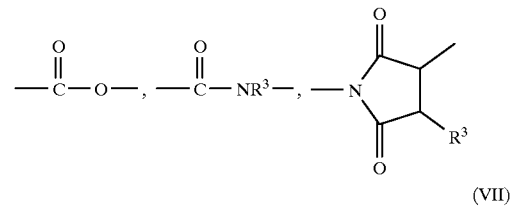
(VI)

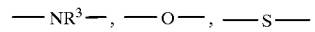
(VII)

where

R$^3$ is a radical R$^4$ or a radical of the formula —C(O)—R$^4$, e, f and g are each an integer from 0–200, with the proviso that the sum e+f+g is $\geq 1$, a is 0, 1 or 2, b is 0, 1, 2 or 3, c is 0, 1, 2 or 3 and the sum a+b+c is $\leq 4$, h is 0, 1, 2 or 3, i is 0, 1, 2 or 3 and the sum h+i is $\leq 3$, A is a radical of the general formula (VIII)

(VIII)

where

R$^6$ is a di- or trivalent hydrocarbon radical having from 2 to 100 carbon atoms per radical, which may be interrupted by one or more groups selected from groups of the above general formulae (VI) and (VII), B is a radical of the general formulae (IX)

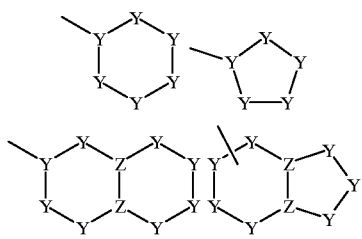

(IX)

where z is 1 or 2, depending on the valency of $R^6$,

Y is chosen from the groups of the formulae $-CR^7{}_2-$, $=CR^7-$, $-NR^7-$, $=N-$, $-O-$, $=PR^7$, $=P-$, $-S-$, $=C=O$ Z is chosen from the groups of the formulae $=C=$, $=CR^7-$, $=N-$, $=P-$, with the proviso that $R^6$ is in a chemically useful position on the heterocycle, the heterocycle has a chemically useful structure and contains at least one nitrogen atom, it being possible for the heterocycle to be saturated, unsaturated or aromatic, $R^7$ is a hydrogen atom or a substituent chosen from $-F$, $-Cl$, $-Br$, $-I$, $-OH$, $-SCN$, $-NC$, $-NO_2$, $-CN$, $-SH$, $-NCO$, $-OR^4$, $-COOH$, $-SO_3H$, $-O-PO_3H$, $-SO_2-R^4$, or an optionally substituted mono-, di- or trivalent hydrocarbon radical having from 2 to 100 carbon atoms per radical, which may be interrupted by groups chosen from $-C(O)-$, $-C(O)-O-$, $-C(O)-NR^3-$, $-NR^3-$, $-O-$, $-S-$;

$A^1$ is a radical of the general formula (X)

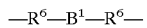 (X)

where $R^6$ is as defined above, and the radicals $R^6$ may be at any two chemically useful positions on the heterocycle, and $B^1$ is a radical of the general formula (XI)

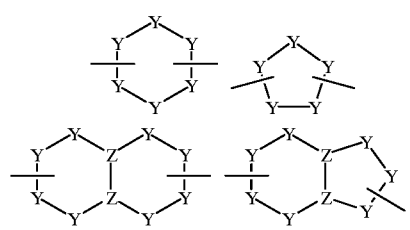

(XI)

where

Y and Z are as defined above, with the proviso that the heterocycle has a chemically useful structure and contains at least one nitrogen atom and may be saturated, unsaturated or aromatic;

$A^2$ is a radical of the general formula (XII)

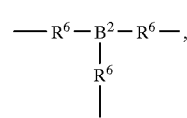

(XII)

where $R^6$ is as defined above, and the radicals $R^6$ may be at any three chemically useful positions on the heterocycle, and $B^2$ is a radical of the general formulae (XIII)

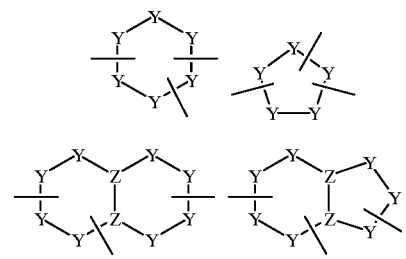

(XIII)

where

Y and Z are as defined above, with the proviso that the heterocycle has a chemically useful structure, contains at least one nitrogen atom and may be saturated, unsaturated or aromatic;

and with the further proviso that at least one group selected from A, $A^1$ or $A^2$ is present per molecule and that in each of groups A, $A^1$ and $A^2$ at least one, two or three unit(s) respectively of the general formula (I) are present.

In $R^6$, either at least one group of the general formula (VI) and at least one group of the general formula (VII) are present or at least one group of the general formula (VI) is present and $R^6$ is bonded to a nitrogen atom in the heterocycle B, or $B^1$, or $B^2$.

The organosiloxane compounds preferably have a mean molecular weight of at least 500 g/mol, in particular at least 5000 g/mol and advantageously at most 1,000,000 g/mol, in particular at most 250,000 g/mol. The organosiloxane compounds preferably have a viscosity of at least 10, in particular at least 20 mm²/s; and preferably at most 100,000 mm²/s, in particular at most 1,000,000 mm²/s at 25° C. The organosiloxane compounds according to the invention can also be solid or waxy.

Examples of radicals $R^2$ are alkyl radicals such as the methyl, ethyl, n-propyl, isopropyl, 1-n-butyl, 2-n-butyl, tert-butyl, n-pentyl, isopentyl, neopentyl and tert-pentyl radicals; hexyl radicals such as the n-hexyl radical; heptyl radicals such as the n-heptyl radical; octyl radicals such as the n-octyl radical and isooctyl radicals and the 2,2,4-trimethylpentyl radical; nonyl radicals such as the n-nonyl radical, decyl radicals such as the n-decyl radical; dodecyl radicals such as the n-dodecyl radical; octadecyl radicals such as the n-octadecyl radical; cycloalkyl radicals such as the cyclopentyl, cyclohexyl and cycloheptyl radicals and methylcyclohexyl radicals; aryl radicals such as the phenyl, naphthyl, anthryl and phenanthryl radicals; alkaryl radicals such as the o-, m-, and p-tolyl radicals; xylyl radicals and ethylphenyl radicals; and aralkyl radicals such as the benzyl radical or the phenylethyl radical. Preference is given to the methyl radical, the n-octyl radical, the n-dodecyl radical and the n-octadecyl radical.

Examples of halogenated radicals $R^2$ are haloalkyl radicals such as the 3,3,3-trifluoro-n-propyl radical, the 2,2,2, 2',2',2'-hexafluoroisopropyl radical, and the heptafluoroisopropyl radical, and haloaryl radicals such as the o-, m-, and p-chlorophenyl radicals.

Examples of alkyl radicals $R^4$ are methyl, ethyl, n-propyl, isopropyl, 1-n-butyl, 2-n-butyl, isobutyl and tert-butyl radicals. Preference is given to the methyl and ethyl radicals.

Examples of alkyl radicals $R^4$, which are substituted by ether oxygens, are the methoxyethyl and the ethoxyethyl radicals.

The radical $R^4$ is preferably a hydrogen atom or a methyl, ethyl, butyl or cyclohexyl group.

The radical $R^5$ is preferably an alkenyl radical, particularly preferably an ethylene, propylene or butylene radical.

The radical $R^3$ is preferably a hydrogen atom, or a methyl or butyl group.

Examples of radicals $R^6$ are substituted alkylene radicals of the formulae

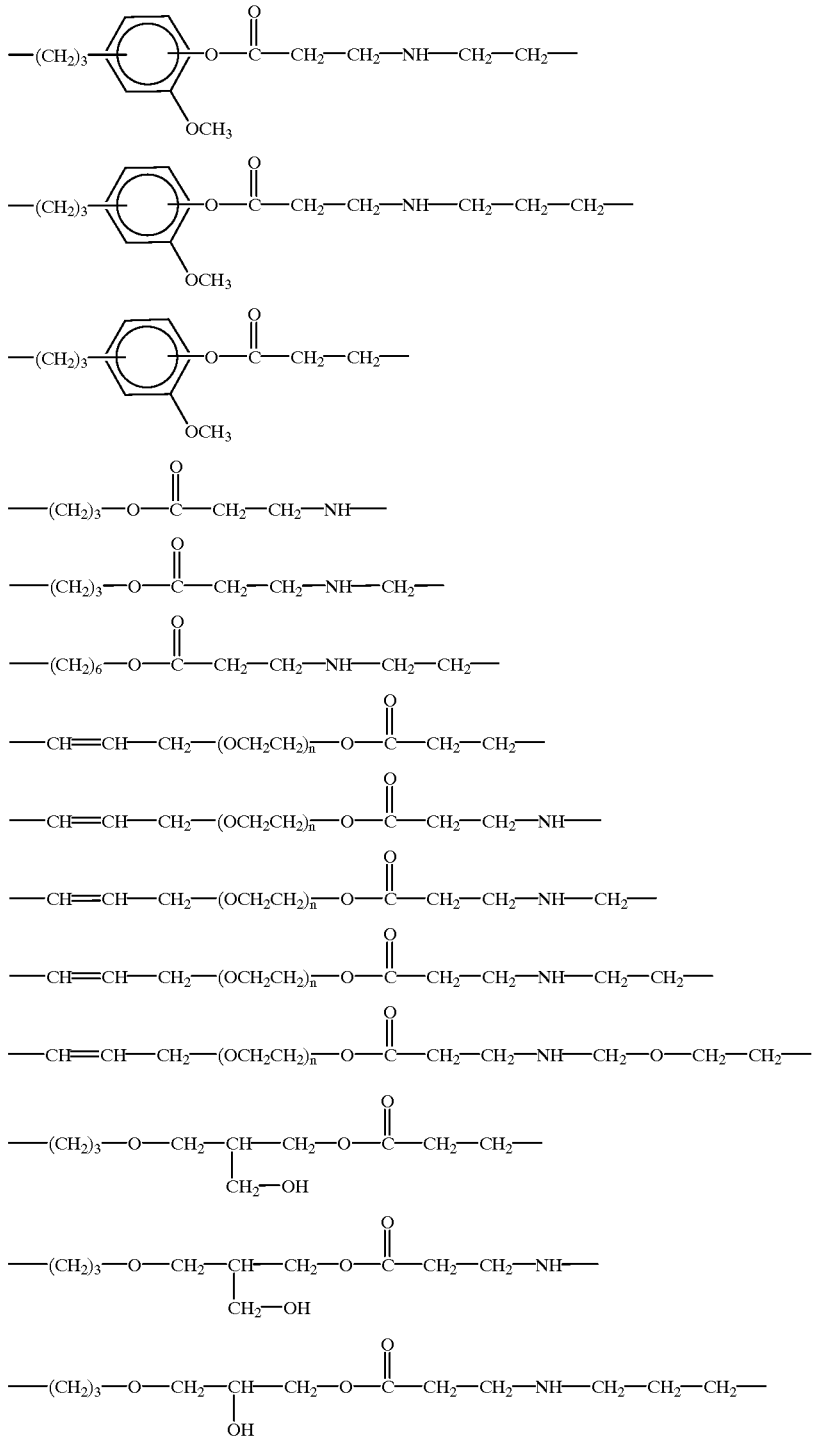

-continued
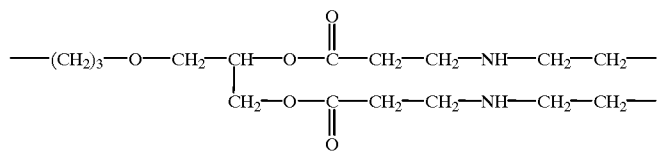
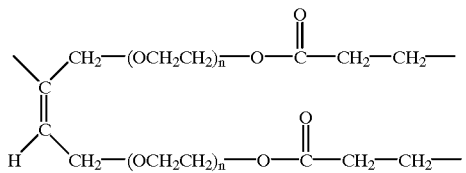
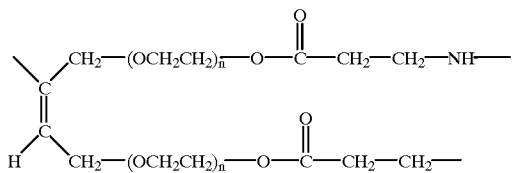
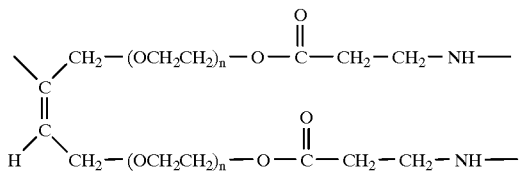
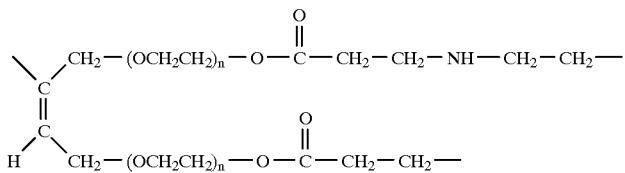
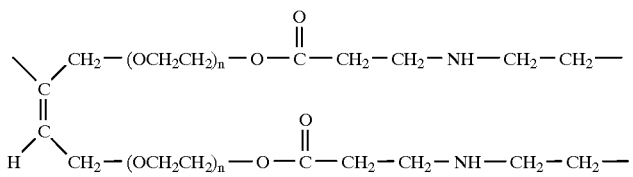
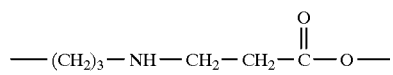
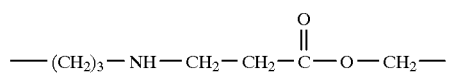
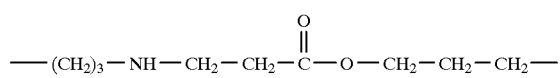
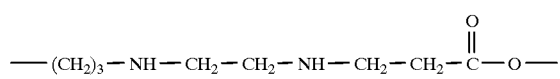
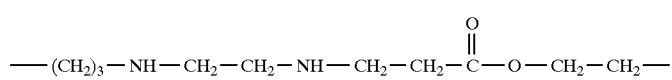
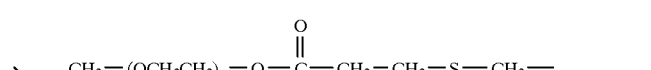
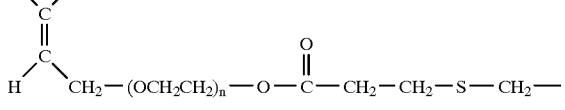

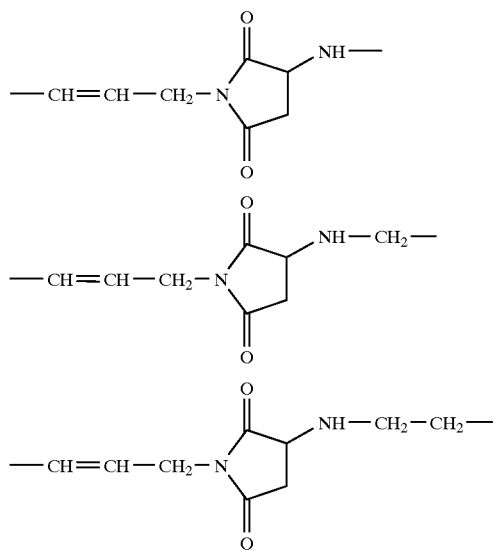
n is preferably an integer from 0 to 30, in particular from 2 to 10.
Particularly preferred radicals $R^6$ are those of the formulae
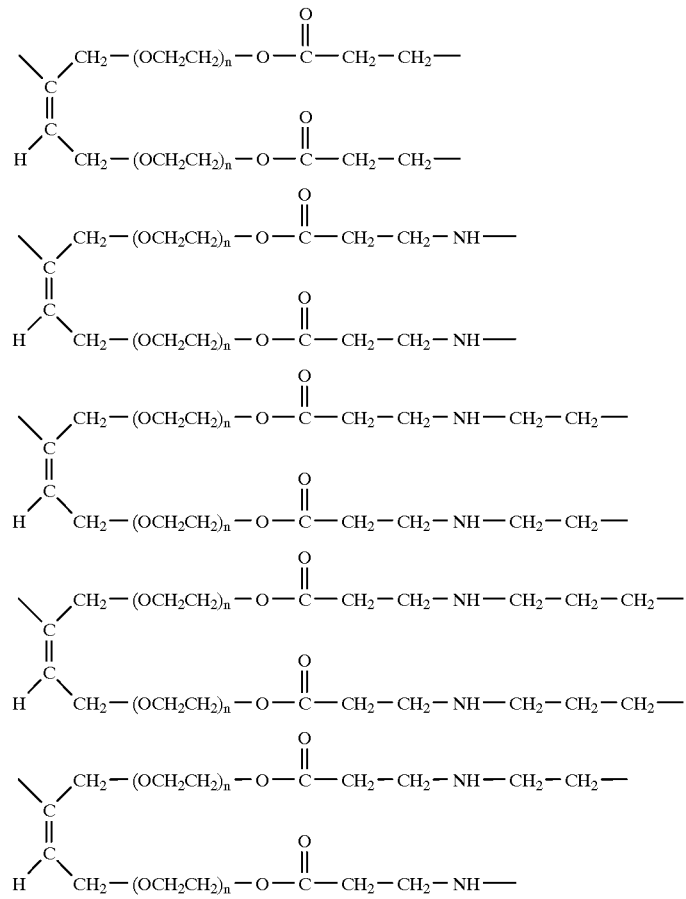

Therein, n is preferably an integer from 2 to 5.

The radical $R^7$ is preferably a hydrogen atom, or a $C_1$–$C_{10}$-alkyl group, particularly preferably a hydrogen atom or a methyl group.

The organosiloxane compounds bearing nitrogen-containing heterocycles preferably contain further siloxane units to which no heterocycles are bonded.

The organosiloxane compounds bearing nitrogen-containing heterocycles can be prepared from readily available starting materials via Michael additions and analogous reactions. Michael additions to siloxane compounds are known, for example, from U.S. Pat. No. 4,606,933.

The invention further provides a process for the preparation of organosiloxane compounds bearing nitrogen-containing heterocycles which contain at least one unit of the general formula (I), in which organosilicon compounds containing units of the general formula $$W_a R^2_b SiX_c O_{[4-(a+b+c)]/2} \tag{XIV},$$

where $R^2$, X, a, b and c are as defined above and

W is a radical of the general formula (XV)

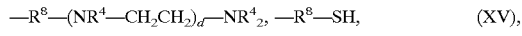

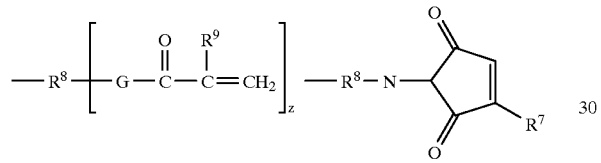

where $R^7$ and $R^4$ are as defined above,

G is a radical of the formulae —O— or —$NR^3$—, d is 0 or an integer from 1 to 8, z is 1 or 2 depending on the valency of $R^8$, $R^9$ is a hydrogen atom or a methyl group and $R^8$ is a di- or trivalent, optionally substituted hydrocarbon radical having from 2 to 100 carbon atoms per radical, which may optionally be interrupted by groups selected from —C(O)—, —C(O)—O—, —C(O)—$NR^3$—, —$NR^3$—, —O—, —S—, with the proviso that at least one unit W is present per molecule, are reacted with heterocyclic compounds selected from compounds of the general formulae (XVI), (XIX) and (XX)

a) B—$(R^8)_u$—$R^{10}$ (XVI)

where

B and $R^8$ are as defined above, u is 0 or 1 and $R^{10}$ is a hydrogen atom, a group —SH or a radical of the general formulae (XVII) or (XVIII)

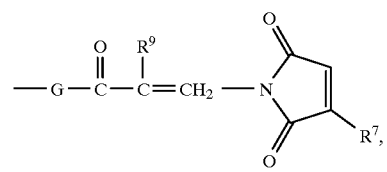

-continued

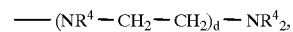

where d, $R^4$, $R^9$ and G are as defined above, with the proviso that, per molecule,
either at least one group —SH, or a radical of the general formulae (XVII) or (XVIII) is present, or Y is, in at least one occurrence, N—H;

b) $R^{10}$—$(R^8)_u$—$B^1$—$(R^8)_u$—$R^{10}$ (XIX)

where $B^1$, u, $R^8$ and $R^{10}$ are as defined above, with the proviso that, per molecule,
either at least two groups of the general formula (XVII) are present or
at least two groups chosen from the group —SH and the general formula (XVIII) are present or
at least one group chosen from the group —SH and the general formula (XVIII) is present and Y is, in at least one occurrence, N—H, or
Y is, in at least two occurrences, N—H,

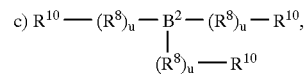

where $B^2$, u, $R^8$ and $R^{10}$ are as defined above, with the proviso that, per molecule,
either at least three groups of the general formula (XVII) are present or
at least three groups selected from the group —SH and the general formula (XVIII) are present or at least two groups chosen from the group —SH and the general formula (XVIII) are present and Y is, in at least one occurrence, N—H, or
at least one group chosen from the group —SH and the general formula (XVIII) is present and Y is, in at least two occurrences, NH, or
Y is, in at least three occurrences, N—H.

The reaction can be carried out, for example, without a diluent, in solution or in emulsion.

In the process, it is possible to use known compounds which catalyze reactions similar to the Michael reaction. Examples are acetic acid, tin(IV) chloride, sodium methoxide and alkali metal amides.

In the process, per mole of the radical W in the organosilicon compound used, preference is given to using at least 0.001 mol, in particular at least 0.01 mol, particularly preferably at least 0.1 mol and preferably at most 10 mol, in particular at most 3 mol and particularly preferably at most 2 mol of radicals of the formula —SH and of the general formulae (XVII) and (XVIII), and Y=NH.

In the process, it is possible to use organic solvents and water or mixtures of the two. Examples of organic solvents are toluene, xylene, THF, n-butyl acetate, isopropanol and dimethoxyethane. Any organic solvent used is preferably removed after the reaction.

The reaction is preferably carried out at a pressure of the surrounding atmosphere, i.e. at about 1020 hPa (abs.). They can, however, also be carried out at higher or lower pressures. In addition, the process is preferably carried out at a temperature of from about 25° C. to about 150° C., in particular at most 120° C., particularly preferably at most 100° C.

$R^9$ is preferably a hydrogen atom.

$R^8$ is preferably a saturated or unsaturated alkylene radical or a radical of the formula

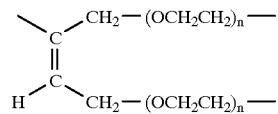

Particular preference is given to the above radical where n=2 to 10.

Examples of compounds of the general formula (XVI) are 4-aminoantipyrine, 2-aminobenzimidazole, 2-aminobenzothiazole, 1-aminobenzotriazole, 4-amino-1-benzylpiperidine, 2-amino-5-bromopyridine, 4-aminoquinaldine, aminoquinolines, 2-amino-4-chloro-6-methylpyrimidine, aminochloropyridines, aminodichloropyridines, aminodichloropyrimidines, aminodimethylpyrimidines, 4-(2-aminoethyl)morpholine, 1-(2-aminoethyl)piperazine, 1-(2-aminoethyl)piperidine, 2-(2-aminoethyl)pyridine, N-(2-aminoethyl)pyrrolidine, aminohydroxyquinolines, aminohydroxypyridines, aminoindoles, 2-amino-5-mercapto-1,3,4-thiadiazole, 3-amino-5-mercapto-1,2,4-triazole, aminomethylisothiazoles, aminomethylisoxazole, aminomethylnitropyridines, aminomethylpyridines, 4-(aminomethyl)piperidine, 1-amino-4-methylpiperazine, aminonicotinic acid, aminonicotinamide, aminophthalimides, ethyl 4-aminopiperidine-1-carboxylate, 1-(3-aminopropyl)imidazole, N-(3-aminopropyl)morpholine, N-(3-aminopropyl)pyrrolidinone, aminopyrazine, aminopyrazole, aminopyridine, aminopyrimidine, 4-amino-2,2,6,6-tetramethylpiperidine, 4-amino-2,2,6,6-tetramethylpiperidin-1-oxyl, aminotetrazole, aminothiazole, aminotriazole, aminouracil, morpholine, pyrrolidine, piperidine and, in particular:

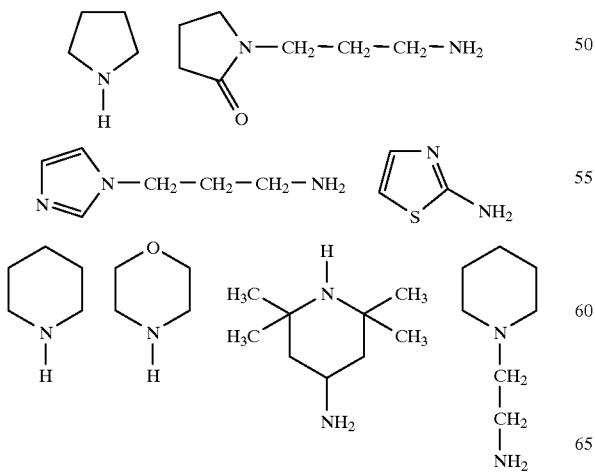

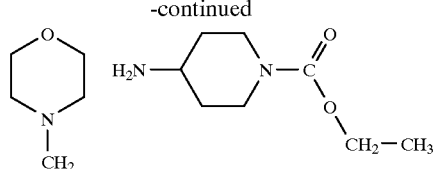

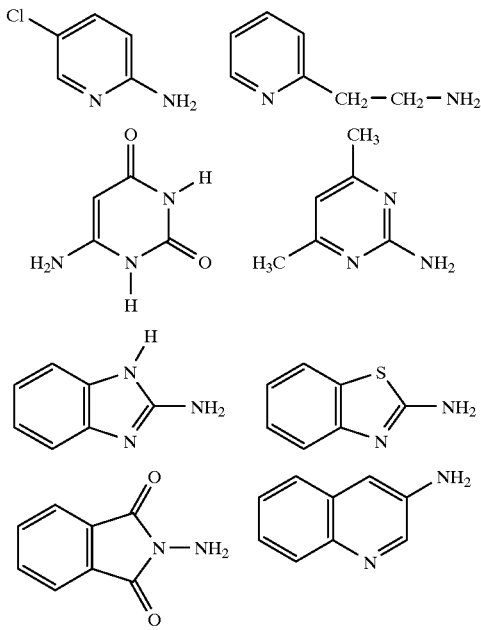

Examples of compounds of the general formula (XIX) are 1-(2-aminoethyl)piperazine, N,N'-bis(3-aminopropyl)piperazine, 4,5-diamino-2,6-dimercaptopyrimidine, 4-aminomethylpiperidine, 4,5-diamino-6-hydroxy-2-mercaptopyrimidine, 2,4-diamino-6-methyl-1,3,5-triazine, 2,6-diaminopurine, diaminopyridines, diaminopyrimidines, 2,6-diamino-4-pyrimidinone, 3,5-diamino-1,2,4-triazole, piperazine and, in particular:

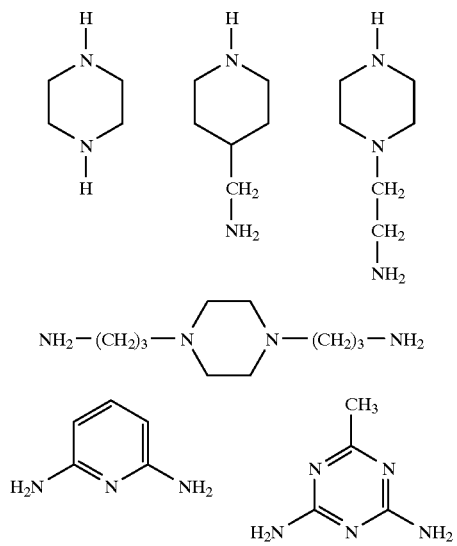

-continued

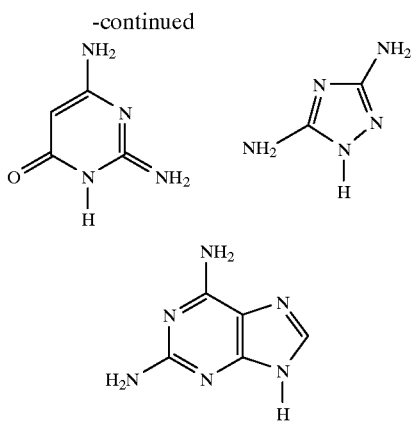

Preferred examples of compounds of the general formula (XX) are

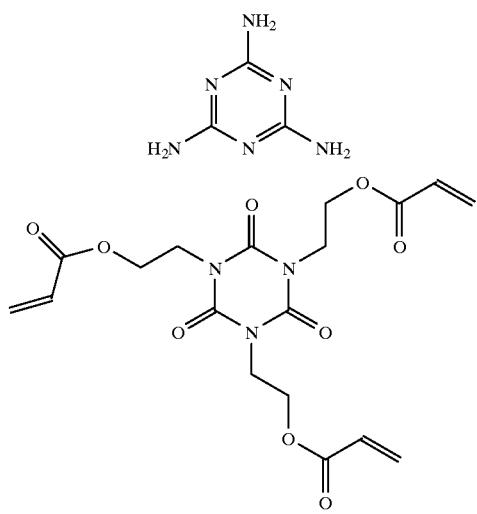

The organosiloxane compounds bearing nitrogen-containing heterocycles obtained by the above process can be equilibrated using heterocycle-free organopolysiloxanes selected from the group consisting of linear organopolysiloxanes having terminal triorganosiloxy groups, linear organopolysiloxanes having terminal hydroxyl groups, cyclic organopolysiloxanes and copolymers of diorganosiloxane and monoorganosiloxane units.

Preferred linear organopolysiloxanes having terminal triorganosiloxy groups are those of the general formula (XXI)

$$R^2{}_3SiO(SiR^2{}_2O)_rSiR^2{}_3 \quad (XXI)$$

where $R^2$ is as defined above and r is 0 or an integer from 1 to 1500.

Preferred linear organopolysiloxanes having terminal hydroxyl groups are those of the general formula (XXII)

$$HO\text{---}(SiR^2{}_2O)_s\text{---}H \quad (XXII)$$

where $R^2$ is as defined above and s is an integer from 1 to 1500.

Preferred cyclic organopolysiloxanes are those of the general formula (XXIII)

$$(R^2{}_2SiO)_t \quad (XXIII)$$

where $R^2$ is as defined above and t is an integer from 3 to 12.

Preferred copolymers are those of units of the general formulae (XXIV) and (XXV)

$$R^2{}_2SiO \quad (XXIV)$$

$$R^2SiO_{3/2} \quad (XXV)$$

where $R^2$ is as defined above.

The mixing ratios of the heterocycle-free-organopolysiloxanes and the organopolysiloxanes containing heterocycles used in the optional equilibration are determined merely by the desired amount of heterocyclic groups in the organopolysiloxanes desired, and by the desired average chain length.

In the equilibration, acidic or, preferably, basic catalysts which promote the equilibration are used. Examples of basic catalysts are benzyltrimethylammonium hydroxide, tetramethylammonium hydroxide, alkali metal hydroxides, alkaline earth metal hydroxides in methanolic solution, phosphonium hydroxides and silanolates. Preference is given to ammonium hydroxides, which are used in amounts of from 50 to 10,000 ppm by weight, in particular from 500 to 2000 ppm, in each case based on the total weight of the organosilicon compounds used. Prior to working up the mixture obtained in the equilibration, it is possible to render the catalyst inactive.

The reaction of acrylated organosilicon compounds with heterocycles having amino groups is preferable. If, for example, a heterocyclic compound having amino groups is used in substoichiometric amounts based on (meth)acrylate groups, the organosiloxane compounds containing heterocycles can be crosslinked via the remaining (meth)acrylate groups by free-radical means or via a hydrosilylation.

If organosiloxane compounds containing primary, secondary or tertiary amino groups in the heterocycles remain, they may be, where appropriate, protonated or acylated.

The organosiloxane compounds bearing nitrogen-containing heterocycles are only subjected to slight heating during the preparation and can thus be prepared in pure form. The organosiloxane compounds can be prepared without transition metal catalysts and are thus free from transition metals. The organosiloxane compounds permit the incorporation of reactive groups.

The organosiloxane compounds containing heterocycles are additionally notable for their easily variable preparation method and the possibility of the targeted construction of partially crosslinked structural elements. The organosiloxane compound polymers are notable for a low tendency toward yellowing and for their resistance to detergents.

The organosilicon compounds can be used for the treatment of textile fibers, textile sheet materials, such as, for example, woven fabrics, knitted goods or nonwoven fabrics and leather, to which they impart good soft handle. They are also used as UV, light, heat and oxidation stabilizers in synthetic polymers.

In the examples below, all data relating to parts and percentages is, unless stated otherwise, by weight. Unless stated otherwise, the examples below are carried out at a pressure of the surrounding atmosphere, i.e. at about 1000 hPa and at room temperature, i.e. 20° C. or a temperature which results when the reactants are added together at room temperature without additional cooling or heating. All of the data relating to the viscosity given in the examples refers to a temperature of 25° C.

EXAMPLE 1

50.0 g ($2.1 \times 10^{-2}$ mol of acrylate groups) of a polydimethylsiloxane having terminal diacrylate groups, a mean chain length of 100, and a viscosity of 580 mm$^2$/s are stirred with 2.7 g ($2.1 \times 10^{-2}$ mol of NH$_2$) of 1-(2-aminoethyl)piperazine and 50 g of 2-propanol at 80° C. for three hours. Evaporation of the solution under reduced pressure (1 mbar) at 60° C. until a constant weight is reached produces 51.6 g (97.9% of theory) of a clear, slightly yellow oil with a viscosity of 5300 mm$^2$/s.

EXAMPLE 2

40.0 g ($2.4 \times 10^{-2}$ mol of acrylate groups) of a polydimethylsiloxane having trimethylsiloxy, dimethylsiloxy and alkenyldiacrylatedimethylsiloxy groups (—O—SiMe$_2$—(RC=CRH); R=—CH$_2$—O—(CH$_2$—CH$_2$—O)$_{2.7}$—C(O)CH=CH$_2$), a mean chain length of 68, and a viscosity of 330 mm$^2$/s are stirred with 2.1 g ($2.4 \times 10^{-2}$ mol of NH$_2$) of piperidine at 80° C. for five hours to give 42 g (99.7% of theory) of a yellow oil with a viscosity of 410 mm$^2$/s.

EXAMPLE 3

40.0 g ($2.4 \times 10^{-2}$ mol of acrylate groups) of a polydimethylsiloxane having trimethylsiloxy, dimethylsiloxy and alkenyldiacrylatedimethylsiloxy groups (—O—SiMe$_2$—(RC=CRH); R= —CH$_2$—(CH$_2$—CH$_2$—O)$_{2.7}$—C(O)CH=CH$_2$), a mean chain length of 68, and a viscosity of 330 mm$^2$/s are dissolved in 20 g of 2-propanol, admixed with 2.9 g ($2.4 \times 10^{-2}$ mol of NH$_2$) of 2-(aminoethyl)pyridine and stirred at 80° C. for three hours. The 2-propanol is then removed under a reduced pressure of one mbar and 60° C. until a constant weight is reached; 41.9 g (97.7% of theory) of a slightly yellow oil with a viscosity of 2300 mm$^2$/s remain.

EXAMPLE 4

60.0 g ($3.6 \times 10^{-2}$ mol of acrylate groups) of a polydimethylsiloxane having trimethylsiloxy, dimethylsiloxy and alkenyldiacrylatedimethylsiloxy groups (—O—SiMe$_2$—(RC=CRH); R=—CH$_2$—O—(CH$_2$—CH$_2$—O)$_{2.7}$—C(O)CH=CH$_2$), a mean chain length of 68, and a viscosity of 330 mm$^2$/s are dissolved in 30 g of 2-propanol, admixed with 5.6 g ($3.6 \times 10^{-2}$ mol of NH$_2$) of 4-amino-2,2,6,6-tetramethylpiperidine and stirred at 80° C. for three hours. The 2-propanol is then removed under a reduced pressure of one mbar and 60° C. until a constant weight is achieved; 65.0 g (99.1% of theory) of a slightly yellow oil with a viscosity of 770 mm$^2$/s remain.

EXAMPLE 5

60.0 g ($3.6 \times 10^{-2}$ mol of acrylate groups) of a polydimethylsiloxane having trimethylsiloxy, dimethylsiloxy and alkenyldiacrylatedimethylsiloxy groups (—O—SiMe$_2$—(RC=CRH); R=—CH$_2$—O—(CH$_2$—CH$_2$—O)$_{2.7}$—C(O)CH=CH$_2$), a mean chain length of 68, and a viscosity of 330 mm$^2$/s are dissolved in 30 g of 2-propanol, admixed with 3.1 g ($3.6 \times 10^{-2}$ mol of NH$_2$) of morpholine and stirred at 80° C. for three hours. The 2-propanol is then removed at a reduced pressure of one mbar and 60° C. until a constant weight is achieved; 62.5 g (99.0% of theory) of a slightly yellow oil with a viscosity of 980 mm$^2$/s remain.

EXAMPLE 6

50.0 g ($3.3 \times 10^{-2}$ mol of acrylate groups) of a polydimethylsiloxane having trimethylsiloxy, dimethylsiloxy and alkenyldiacrylatedimethylsiloxy groups (—O—SiMe$_2$—(RC=CRH); R=—CH$_2$—O—(CH$_2$—CH$_2$—O)$_{2.7}$—C(O)CH=CH$_2$), a mean chain length of 64, and a viscosity of 270 mm$^2$/s are dissolved in 20 g of 2-propanol, admixed with 4.7 g ($3.3 \times 10^{-2}$ mol of NH$_2$) of N-(3-aminopropyl)-2-pyrolidinone and stirred at 80° C. for three hours. The 2-propanol is then removed at a reduced pressure of one mbar and 60° C. until a constant weight is reached; 53.8 g (99.0% of theory) of a yellow oil with a viscosity of 6930 mm$^2$/s remain.

EXAMPLE 7

30.0 g ($6.3 \times 10^{-2}$ mol of acrylate groups) of a polydimethylsiloxane having dimethylsiloxy and alkenyldiacrylatedimethylsiloxy groups (—O—SiMe$_2$—(RC=CRH); R=—CH$_2$—O—(CH$_2$—CH$_2$—O)$_{2.7}$—C(O)CH=CH$_2$), a mean chain length of 13, and a viscosity of 144 mm$^2$/s are added to a solution of 8.1 g ($6.3 \times 10^{-2}$ mol of NH$_2$) of 1-(2-aminoethyl)piperazine in 19 g of 2-propanol at 70° C. over the course of 1.5 h, and the mixture is then stirred at 70° C. for a further two hours. The 2-propanol is then removed at a reduced pressure of one mbar and 60° C. until a constant weight is achieved; 37.5 g (98.4% of theory) of a yellow oil with a viscosity of 6620 mm$^2$/s remain.

EXAMPLE 8

30.0 g ($6.3 \times 10^{-2}$ mol of acrylate groups) of a polydimethylsiloxane having dimethylsiloxy and alkenyldiacrylatedimethylsiloxy groups (—O—SiMe$_2$—(RC=CRH); R=—CH$_2$—O— (CH$_2$—CH$_2$—O)$_{2.7}$—C(O)CH=CH$_2$), a mean chain length of 13, and a viscosity of 144 mm$^2$/s are added to a solution of 7.8 g ($6.0 \times 10^{-2}$ mol of NH$_2$) of 1-(2-aminoethyl)piperazine in 19 g of 2-propanol at 70° C. over the course of 1.5 h, and the mixture is then stirred at 70° C. for a further two hours. The 2-propanol is then removed at a reduced pressure of one mbar and 60° C. until a constant weight is achieved; 37.1 g (98.1% of theory) of a yellow oil with a viscosity of 7100 mm$^2$/s remain.

EXAMPLE 9

30.0 g ($6.3 \times 10^{-2}$ mol of acrylate groups) of a polydimethylsiloxane having dimethylsiloxy and alkenyldiacrylatedimethylsiloxy groups (—O—SiMe$_2$—(RC=CRH); R=—CH$_2$—O—(CH$_2$—CH$_2$—O)$_{2.7}$—C(O)CH=CH$_2$), a mean chain length of 13, and a viscosity of 144 mm$^2$/s are dissolved in 20 g of 2-propanol, admixed with 9.8 g ($6.3 \times 10^{-2}$ mol of NH$_2$) of 4-amino-2,2,6,6-tetramethylpiperidine and stirred at 70° C. for three hours. The 2-propanol is then removed at a reduced pressure of one mbar and 60° C. until a constant weight is achieved; 39.1 g (98.2% of theory) of a yellow oil with a viscosity of 582 mm$^2$/s remain.

EXAMPLE 10

30.0 g ($6.3 \times 10^{-2}$ mol of acrylate groups) of a polydimethylsiloxane having dimethylsiloxy and alkenyldiacrylatedimethylsiloxy groups (—O—SiMe$_2$—(RC=CRH); R=—CH$_2$—O—(CH$_2$—CH$_2$—O)$_{2.7}$—C(O)CH=CH$_2$), a mean chain length of 13 and a viscosity of 144 mm$^2$/s are dissolved in 20 g of 2-propanol, admixed with 8.2 g ($6.3 \times$ $10^{-2}$ mol of $NH_2$) of 4-(2-aminoethyl)morpholine and stirred at 70° C. for three hours. The 2-propanol is then removed at a reduced pressure of one mbar and 60° C. until a constant weight is achieved; 37.8 g (99.0% of theory) of a yellow oil with a viscosity of 624 mm²/s remain.

What is claimed is:

1. An organosiloxane compound bearing nitrogen-containing heterocycles, in which the heterocycles are bonded to a silicon atom via di- or polyvalent radicals which contain a unit of the general formula (I)

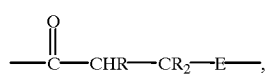
(I)

in which

E is the radical —O—, —S—, —NR¹— or —N=, where R and $R^1$ are each a hydrogen atom or a $C_1$- to $C_{20}$-hydrocarbon radical, which is optionally substituted by halogen, amine, ammonium or mercapto groups and may optionally be interrupted by groups selected from —C(O)—, —C(O)—O—, —C(O)—$NR^3$—, —$NR^3$—, —O—, —S—, and —N= is a constituent of a heterocycle.

2. An organosiloxane compound as claimed in claim 1 which contains units selected from units of the general formulae (II), (III) and (IV)

$A_a R^2_b SiX_c O_{[4-(a+b+c)]/2}$ (II), $(O_{(3-h-i)/2} X_i R^2_h Si)—A^1—(SiR^2_h X_i O_{(3-h-i)/2})$ (III),

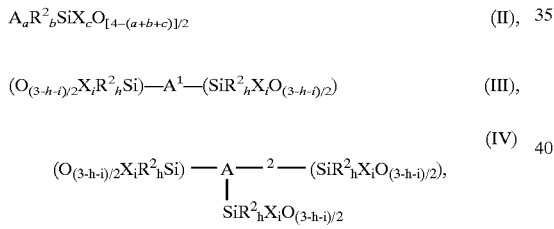
(IV)

where $R^2$ is a monovalent, divalent or trivalent hydrocarbon radical having from 1 to 50 carbon atoms per radical, which is optionally substituted by halogen, amine, ammonium, mercapto, acrylate or maleinimide groups, X is a chlorine atom or a radical of the formula —$OR^4$, where $R^4$ is a hydrogen atom or an alkyl radical having from 1 to 8 carbon atoms per radical, optionally substituted by an ether oxygen atom, or is a radical of the general formula (V)

—$R^5$—[OCH(CH_3)CH_2]_e[OCH_2CH_2]_f[O(CH_2)_4]_g OR^3$ (V)

where $R^5$ is a divalent hydrocarbon radical having from 2 to 30 carbon atoms per radical, optionally interrupted by one or more groups selected from groups of the general formulae (VI) and (VII)

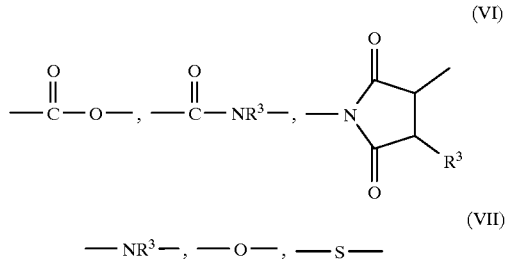

where $R^3$ is a radical $R^4$ or a radical of the formula —C(O)—$R^4$, e, f and g are each an integer from 0–200, with the proviso that the sum e+f+g is $\geq 1$, a is 0, 1 or 2, b is 0, 1, 2 or 3, c is 0, 1, 2 or 3 and the sum a+b+c is $\leq 4$, h is 0, 1, 2 or 3, i is 0, 1, 2 or 3 and the sum h+i is $\leq 3$, A is a radical of the general formula (VIII)

—$R^6$—(B)_z$ (VIII)

where $R^6$ is a di- or trivalent hydrocarbon radical having from 2 to 100 carbon atoms per radical, optionally interrupted by one or more groups selected from groups of the above general formulae (VI) and (VII), B is a radical of the general formulae (IX)

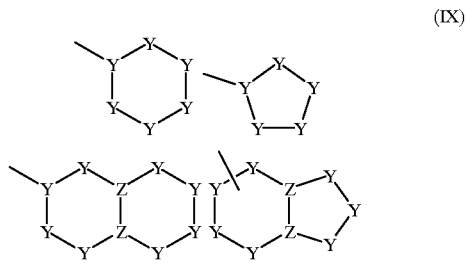
(IX)

where z is 1 or 2, depending on the valency of $R^6$,

Y is selected from the group consisting of the formulae —$CR^7_2$—, =$CR^7$—, —$NR^7$—, =N—, —O—, =$PR^7$, =P—, —S—, and =C=O Z is selected from the group consisting of the formulae =C=, =$CR^7$—, =N—, and =P—, with the proviso that $R^6$ is in a chemically useful position on the heterocycle, the heterocycle has a chemically useful structure and contains at least one nitrogen atom, the heterocycle being saturated, unsaturated or aromatic, $R^7$ is a hydrogen atom, a substituent selected from the group consisting of —F, —Cl, —Br, —I, —OH, —SCN, —NC, —NO_2, —CN, —SH, —NCO, —$OR^4$, —COOH, —SO_3H, —O—PO_3H, and —SO_2—$R^4$, or an optionally substituted mono-, di- or trivalent hydrocarbon radical having from 2 to 100 carbon atoms per radical optionally interrupted by —C(O)—, —C(O)—O—, —C(O)—$NR^3$—, —$NR^3$—, —O—, —S—;

$A^1$ is a radical of the general formula (X)

—$R^6$—$B^1$—$R^6$— (X)

where
R⁶ is as defined above, and the radicals R⁶ are at any two chemically useful positions on the heterocycle, and
B¹ is a radical of the general formula (XI)

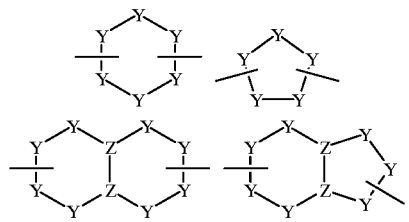 (XI)

where
Y and Z are as defined above, with the proviso that the heterocycle has a chemically useful structure and contains at least one nitrogen atom and may be saturated, unsaturated or aromatic;
A² is a radical of the general formula (XII)

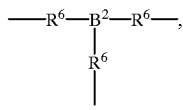 (XII)

where
R⁶ is as defined above, and the radicals R⁶ are positioned at any chemically useful positions on the heterocycle, and
B² is a radical of the general formulae (XIII)

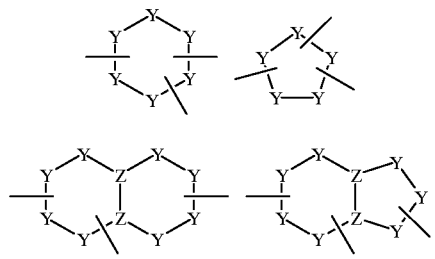 (XIII)

where
Y and Z are as defined above, with the proviso that the heterocycle has a chemically useful structure, contains at least one nitrogen atom and is saturated, unsaturated or aromatic;
with the proviso that at least one group selected from A, A¹ or A² is present per molecule and that in each of groups A, A¹ and A² at least one, two or three unit(s) respectively of the general formula (I) are present.

3. An organosiloxane compound as claimed in claim 1 which has a mean molecular weight from about 5000 g/mol to about 1,000,000 g/mol.

4. An organosiloxane compound as claimed in claim 2 which has a mean molecular weight from about 5000 g/mol to about 1,000,000 g/mol.

5. An organosiloxane compound as claimed in claim 1, which contains further siloxane units to which no heterocycles are bonded.

6. An organosiloxane compound as claimed in claim 2, which contains further siloxane units to which no heterocycles are bonded.

7. An organosiloxane compound as claimed in claim 3, which contains further siloxane units to which no heterocycles are bonded.

8. A process for the preparation of organosiloxane compounds bearing nitrogen-containing heterocycles, which contain at least one unit of the general formula (I),

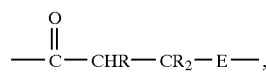 (I)

in which organosilicon compounds containing units of the general formula

 (XIV), where
R² is a monovalent, divalent or trivalent hydrocarbon radical having from 1 to 50 carbon atoms per radical, which is optionally substituted by halogen, amine, ammonium, mercapto, acrylate or maleinimide groups,
X is a chlorine atom or a radical of the formula —OR⁴, where
R⁴ is a hydrogen atom or an alkyl radical having from 1 to 8 carbon atoms per radical, optionally substituted by an ether oxygen atom, or is a radical of the general formula (V)

 (V)

where
R⁵ is a divalent hydrocarbon radical having from 2 to 30 carbon atoms per radical, optionally interrupted by one or more groups selected from groups of the general formulae (VI) and (VII)

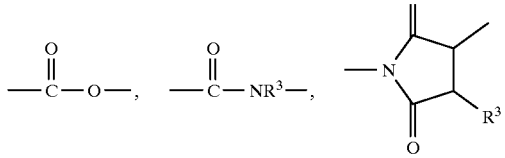 (VI)

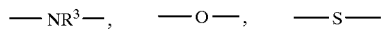 (VII)

where
R³ is a radical R⁴ or a radical of the formula —C(O)—R⁴,
e, f and g are each an integer from 0–200, with the proviso that the sum e+f+g is ≧1,
a is 0, 1 or 2,
b is 0, 1, 2 or 3,
c is 0, 1, 2 or 3 and the sum a+b+c is ≦4, and
W is a radical of the general formulae (XV)

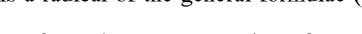

$$-R^8 \left[ G-\overset{O}{\overset{\|}{C}}-\overset{R^9}{\overset{|}{C}}=CH_2 \right]_z \quad -R^8 \underset{O}{\overset{O}{\bigcirc}} R^7$$

where

R⁷ is a hydrogen atom, a substituent selected from the group consisting of —F, —Cl, —Br, —I, —OH, —SCN, —NC, —NO₂, —CN, —SH, —NCO, —OR⁴, —COOH, —SO₃H, —O—PO₃H, and —SO₂—R⁴, or an optionally substituted mono-, di- or trivalent hydrocarbon radical having from 2 to 100 carbon atoms per radical optionally interrupted by —C(O)—, —C(O)—O—, —C(O)—NR³—, —NR³—, —O—, —S—;

G is a radical of the formulae —O— or —NR³—, d is 0 or an integer from 1 to 8, z is 1 or 2 depending on the valency of R⁸, R⁹ is a hydrogen atom or a methyl group and R⁸ is a di- or trivalent, optionally substituted hydrocarbon radical having from 2 to 100 carbon atoms per radical, optionally interrupted by groups selected from —C(O)—, —C(O)—O—, —C(O)—NR³—, —NR³—, —O—, —S—, with the proviso that at least one unit W is present per molecule, are reacted with heterocyclic compounds selected from compounds of the general formulae (XVI), (XIX) and (XX)

a) B—(R⁸)ᵤ—R₁₀ (XVI)

where

B is a radical of the general formulae (IX)

(IX)

where z is 1 or 2, depending on the valency of R⁶,

Y is selected from the group consisting of the formulae —CR⁷₂—, =CR⁷—, —NR⁷—, =N—, —O—, =PR⁷, =P—, —S—, and =C=O Z is selected from the group consisting of the formulae =C=, =CR⁷—, =N—, and =P—, with the proviso that R⁶ is in a chemically useful position on the heterocycle, the heterocycle has a chemically useful structure and contains at least one nitrogen atom, the heterocycle being saturated, unsaturated or aromatic, R⁸ is as defined above, u is 0 or 1 and R¹⁰ is a hydrogen atom, a group —SH or a radical of the general formulae (XVII) or (XVIII)

(XVII)

$$-G-\overset{O}{\overset{\|}{C}}-\overset{R^9}{\overset{|}{C}}=CH_2 \quad -N\underset{O}{\overset{O}{\bigcirc}} R^7,$$

where d, R⁴, R⁹ and G are as defined above, with the proviso that, per molecule, either at least one group —SH, or a radical of the general formulae (XVII) or (XVIII) is present, or at least one Y is N—H;

b) R¹⁰—(R⁸)ᵤ—B¹—(R⁸)ᵤ—R¹⁰ (XIX)

where

B¹ is a radical of the general formula (XI)

(XI)

where

Y and Z are as defined above, with the proviso that the heterocycle has a chemically useful structure and contains at least one nitrogen atom and may be saturated, unsaturated or aromatic;

u, R⁸ and R¹⁰ are as defined above, with the proviso that, per molecule,
either at least two groups of the general formula (XVII) are present or
at least two groups selected from the group consisting of —SH and the general formula (XVIII) are present, or
at least one group selected from the group consisting of —SH and the general formula (XVIII) is present, and at least one Y is N—H or at least two Y are N—H, c) R¹⁰—(R⁸)ᵤ—B²—(R⁸)ᵤ—R¹⁰ (XX)
         |
       (R⁸)ᵤ—R¹⁰ where

B² is a radical of the general formulae (XIII)

(XIII)

-continued

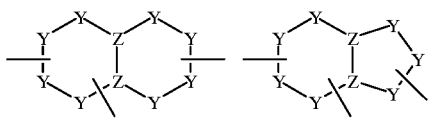

where
Y and Z are as defined above, with the proviso that the heterocycle has a chemically useful structure, contains at least one nitrogen atom and is saturated, unsaturated or aromatic;
u, $R^8$ and $R^{10}$ are as defined above,
with the proviso that, per molecule,
either at least three groups of the general formula (XVII) are present, or
at least three groups selected from the group consisting of —SH and the general formula (XVIII) are present, or
at least two groups selected from the group consisting of —SH and the general formula (XVIII) are present and at least one Y is N—H or
at least one group selected from the group consisting of —SH and the general formula (XVIII) is present and at least two Y are N—H or at least three Y are N—H.

9. In a process for the treatment of textile fibers, textile sheet materials and leather with nitrogen-containing organosiloxanes, the improvement comprising selecting as said nitrogen-containing organopolysiloxanes the organosiloxanes bearing nitrogen-containing heterocycles as claimed in claim 1.

10. In a process for the treatment of textile fibers, textile sheet materials and leather with nitrogen-containing organosiloxanes, the improvement comprising selecting as said nitrogen-containing organopolysiloxanes the organosiloxanes bearing nitrogen-containing heterocycles as claimed in claim 2.

11. In a process for the treatment of textile fibers, textile sheet materials and leather with nitrogen-containing organosiloxanes, the improvement comprising selecting as said nitrogen-containing organopolysiloxanes the organosiloxanes bearing nitrogen-containing heterocycles as claimed in claim 3.

12. In a process for the treatment of textile fibers, textile sheet materials and leather with nitrogen-containing organosiloxanes, the improvement comprising selecting as said nitrogen-containing organopolysiloxanes the organosiloxanes bearing nitrogen-containing heterocycles as claimed in claim 4.

13. In a process for the treatment of textile fibers, textile sheet materials and leather with nitrogen-containing organosiloxanes, the improvement comprising selecting as said nitrogen-containing organopolysiloxanes the organosiloxanes bearing nitrogen-containing heterocycles as claimed in claim 5.

14. In a process for the treatment of textile fibers, textile sheet materials and leather with nitrogen-containing organosiloxanes, the improvement comprising selecting as said nitrogen-containing organopolysiloxanes the organosiloxanes bearing nitrogen-containing heterocycles as claimed in claim 6.

15. In a process for the treatment of textile fibers, textile sheet materials and leather with nitrogen-containing organosiloxanes, the improvement comprising selecting as said nitrogen-containing organopolysiloxanes the organosiloxanes bearing nitrogen-containing heterocycles as claimed in claim 7.

16. In a process of stabilizing a synthetic polymer by incorporation of a stabilizer compound into said polymer, the improvement comprising selecting as said stabilizer compound, organosiloxanes bearing nitrogen-containing heterocycles as claimed in claim 1.

17. In a process of stabilizing a synthetic polymer by incorporation of a stabilizer compound into said polymer, the improvement comprising selecting as said stabilizer compound, organosiloxanes bearing nitrogen-containing heterocycles as claimed in claim 2.

18. In a process of stabilizing a synthetic polymer by incorporation of a stabilizer compound into said polymer, the improvement comprising selecting as said stabilizer compound, organosiloxanes bearing nitrogen-containing heterocycles as claimed in claim 3.

19. In a process of stabilizing a synthetic polymer by incorporation of a stabilizer compound into said polymer, the improvement comprising selecting as said stabilizer compound, organosiloxanes bearing nitrogen-containing heterocycles as claimed in claim 4.

20. In a process of stabilizing a synthetic polymer by incorporation of a stabilizer compound into said polymer, the improvement comprising selecting as said stabilizer compound, organosiloxanes bearing nitrogen-containing heterocycles as claimed in claim 5.

\* \* \* \* \*